Nov. 21, 1967    F. C. BEEKLEY    3,354,467
INFORMATION RETRIEVAL MACHINE AND METHOD
Filed May 27, 1964    5 Sheets-Sheet 1

INVENTOR.
FRANCIS CHEYNEY BEEKLEY
BY Lindsey, Prutzman and Hayes
ATTORNEYS

Nov. 21, 1967 F. C. BEEKLEY 3,354,467
INFORMATION RETRIEVAL MACHINE AND METHOD
Filed May 27, 1964 5 Sheets-Sheet 2
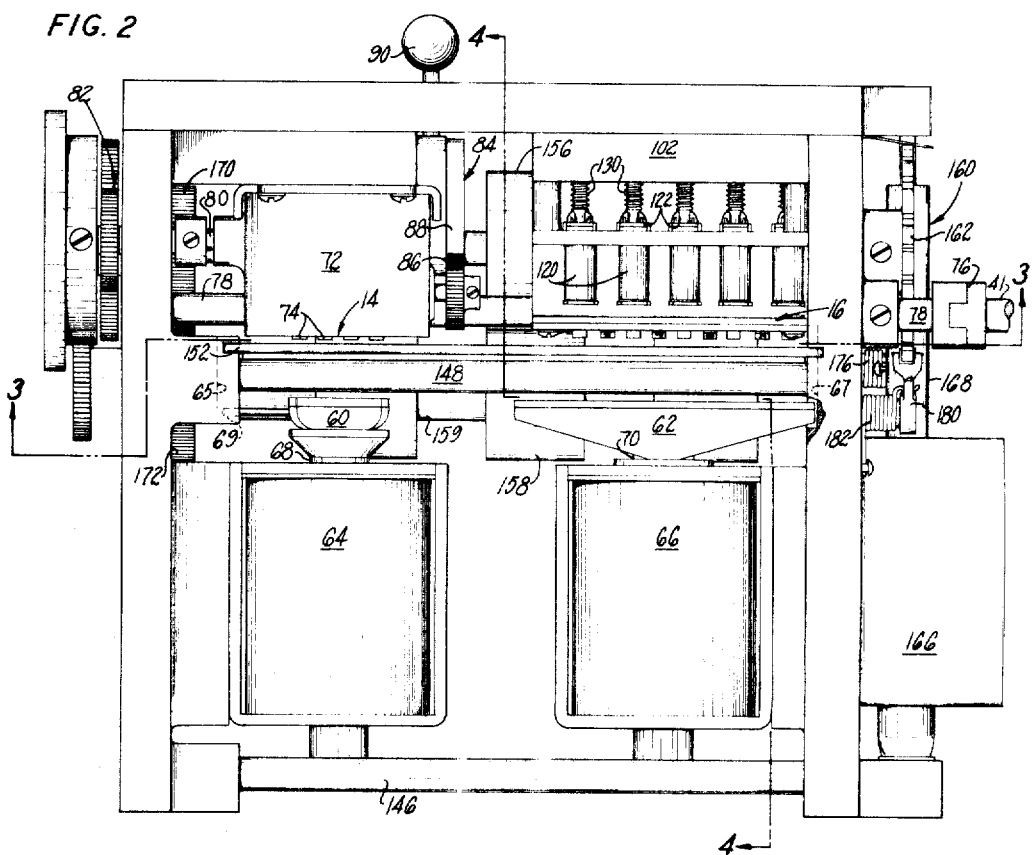
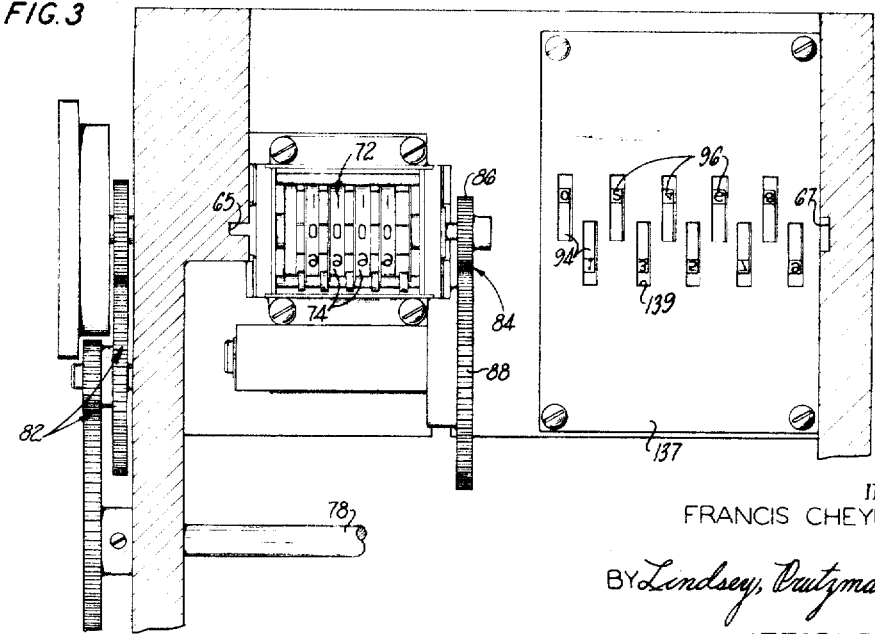
INVENTOR.
FRANCIS CHEYNEY BEEKLEY
BY Lindsey, Prutzman and Hays
ATTORNEYS Nov. 21, 1967   F. C. BEEKLEY   3,354,467
INFORMATION RETRIEVAL MACHINE AND METHOD
Filed May 27, 1964   5 Sheets-Sheet 3

INVENTOR.
FRANCIS CHEYNEY BEEKLEY
BY Lindsey, Prutzman and Hayes
ATTORNEYS

INVENTOR.
FRANCIS CHEYNEY BEEKLEY

BY Lindsey, Prutzman and Hayes
ATTORNEYS

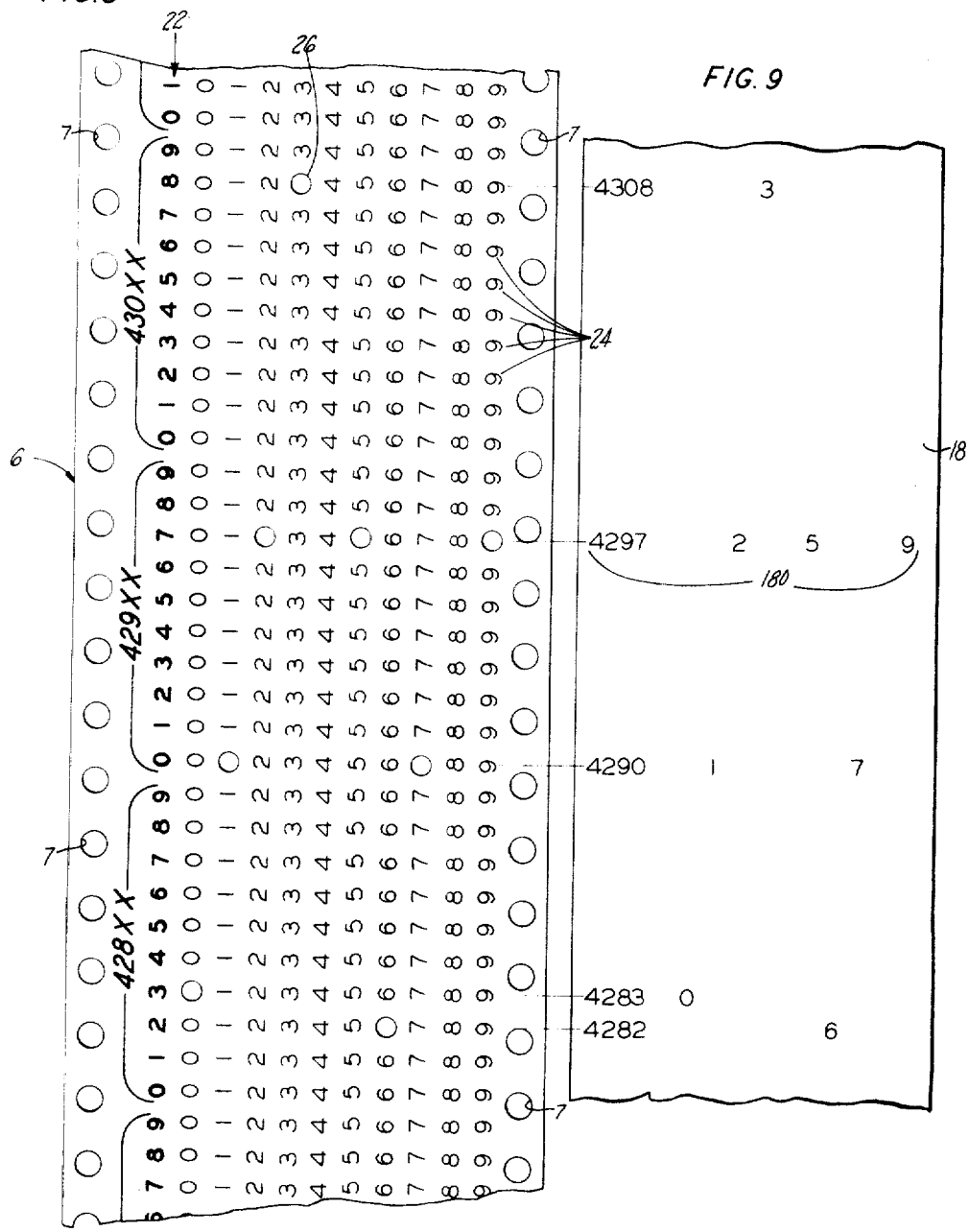

United States Patent Office 3,354,467
Patented Nov. 21, 1967

3,354,467
INFORMATION RETRIEVAL MACHINE AND METHOD
Francis Cheyney Beekley, West Hartford, Conn., assignor to The Beekley Corporation, West Hartford, Conn., a corporation of Connecticut
Filed May 27, 1964, Ser. No. 370,477
15 Claims. (Cl. 340—172.5)

ABSTRACT OF THE DISCLOSURE

A method and apparatus for the retrieval and high speed print out of identification indicia of selected sources of information involving the movement past a detector of a plurality of superposed tapes each representing a specific characteristic and providing a codal area which is in an identical relative position on each tape for the same source. The detector will produce a signal whenever all of the superposed tapes are marked as by punching in the codal area for the same source to activate the print out mechanism which includes a plurality of independent printing arms capable of printing a plurality of terminal symbols or lower order numerals simultaneously with each other and with a printer for printing the higher order symbols or numerals.

---

This invention generally relates to information processing and more particularly to a novel machine for and method of locating or selecting, among known sources of information, various sources of information pertaining to or involving certain preselected data or characteristics.

One of the objects of the present invention is to provide a novel information retrieval machine and method for locating with speed, accuracy and efficiency, various sources of information relating to or involving certain predetermined data which has been fed into the machine. Included herein is the provision of such a machine which will accommodate various combinations and quantities of source references and will select, by search among a predetermined group of information sources, only those sources which relate to or involve the desired information.

A further object of the present invention is to provide in such a machine a novel indicating mechanism, that will identify the desired information sources, represented by data fed into the machine, at a relatively high speed. Included herein is the provision of a novel print-out mechanism that includes a novel combination of printing devices which are actuated simultaneously to print various portions of the same indicia identifying the machine-located information sources, but which are operable independently so as to permit the machine to sense and respond to a plurality of different indicated information sources simultaneously to thereby highly increase the speed of the operation.

A still further object of the present invention is to provide such an information retrieval machine wherein the information sources located thereby may be visually read in lieu of, or in conjunction with, the printing mechanism.

Another object of this invention is to provide an information retrieval machine wherein the information sources located thereby may be quantitatively counted in lieu of, or in conjunction with, the printing mechanism.

A still further object of the present invention is to provide in such an information retrieval machine a light sensitive means for automatically identifying the desired information sources and for controlling the actuation of the recording mechanism.

A still further object of the present invention is to provide such an information retrieval machine which is virtually fully automatic and therefore easy to operate and not subject to human error and which is comprised of parts that are compactly arranged and will provide effective service with accurate results over long periods of repeated use.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 2 is an enlarged front elevational view of the printing mechanism included in the machine shown in FIG. 1, with a portion of the casing removed;

FIG. 3 is a fragmentary cross-sectional view taken generally along lines 3—3 of FIG. 2;

FIG. 8 is a fragmentary plan view of an input tape bearing references to information sources, which tape is utilized by the machine; and FIG. 9 is a fragmentary plan view of a print-out tape provided by the machine in response to the single input tape shown in FIG. 8.

Figure 1:
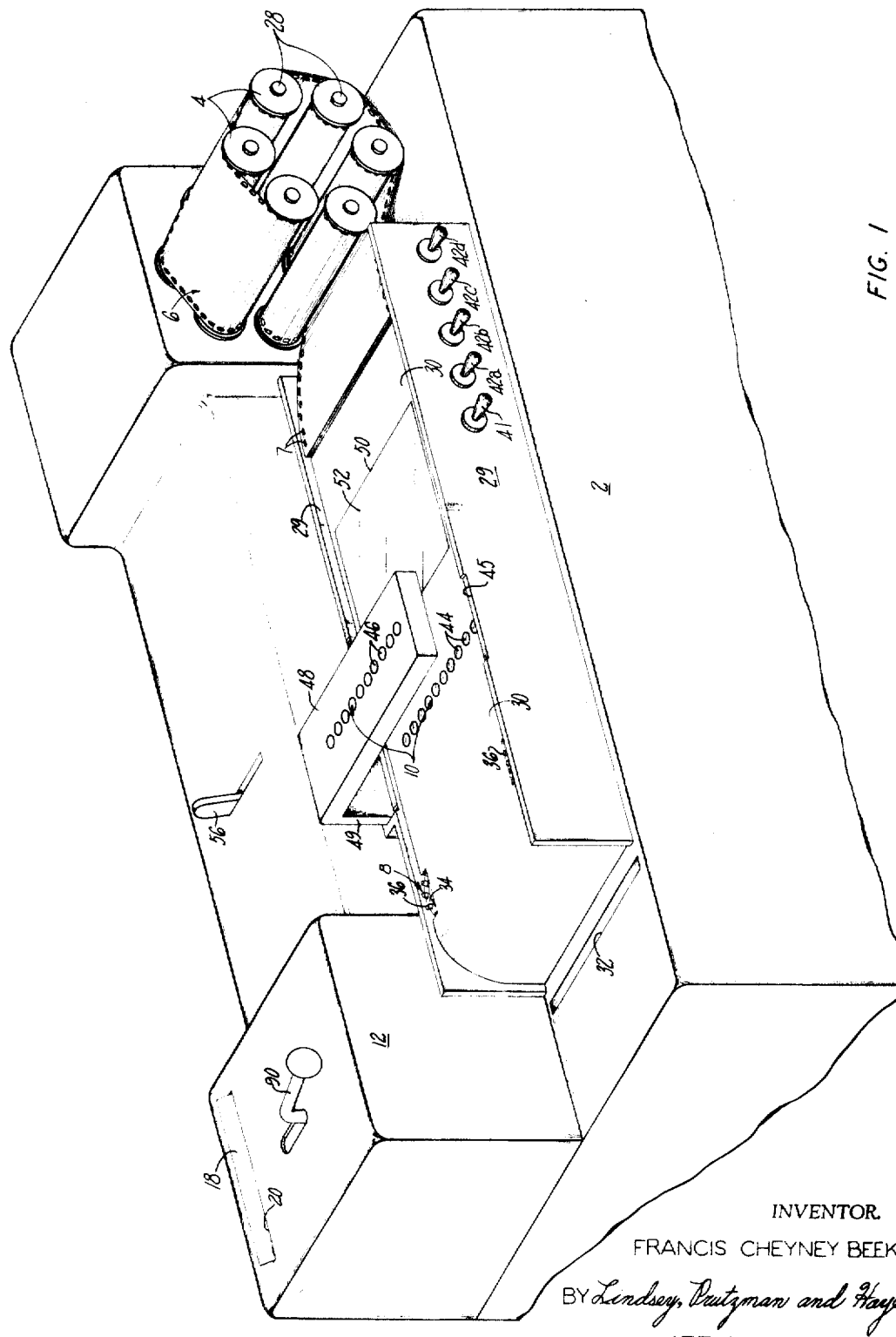
FIG. 1 is a perspective view, partly broken away, of a machine constructed in accordance with the present invention.

Referring to the drawings in detail, FIG. 1 shows a machine embodying the present invention as basically including a casing 2, a plurality of spools 4 mounted for rotatable movement at one end of the casing and each having a roll of input tape 6 mounted thereon, a sprocket drive means 8 for advancing the input tapes 6 simultaneously, and a sensing device or scanning head 10 for reading the input tapes 6 to identify the desired information sources represented thereon and for controlling the operation of a printing mechanism 12. The printing mechanism 12 includes two printing devices 14, 16 which print indicia representing the located information sources on a tape 18 which is then discharged from a slot 20 in the casing 2.

For purposes of illustration, this invention will be described in conjunction with the retrieval of medical data and records.

In the illustrated embodiment, each input tape 6 has marked thereon an identical sequence of numbers, each number or codal area on each roll representing or identifying a particular source of information such as; for example, a known case history. Referring to FIGURE 8, the numbers are arranged in series of groups 428XX, 429XX, 430XX, etc., each group representing one hundred case histories and forming, in effect, one block of numbers in a series of blocks successively arranged on the tape, with the block number forming the higher order digits of the reference numbers contained in that block. The two lower order digits, or the tens and units digits of each case number are determined by the particular codal area in each block which is assigned thereto. The tens digit for each group is indicated by a longitudinal row 22, (extending longitudinally of the tape 6) of numerals 0–9 and the unit digits of each group are shown as being assigned a particular codal area of the block for each group with the areas assigned to the unit digits being arranged in ten columns 24, each extending transversely across the tape 6 laterally aligned with the areas assigned to each of the tens digits with the areas for the units digits being indicated by the sequence of numerals 0–9. Thus, to obtain the identification of each case history the numeral from longitudinal row 22 and the digit representing the lateral area of the input tape assigned to the case history are added to the group number. To illustrate this, referring to FIGURE 8, the position designated 26 on the data tape 6 corresponds to case number 43,083.

Although in the illustrated embodiment, digits have been employed to identify the case histories, it will be understood that other suitable indicia such as letters may also be employed to equal advantage, and the number of codal areas laterally accommodated may be greater or lesser than the ten illustrated.

For medical case histories, each input tape 6 may represent a different characteristic or condition of the patient, and thus, if a given case history were concerned with that condition or characteristic the area on the input tape 6 assigned to that case history (represented by a number) would be pre-punched or otherwise marked with suitable indicia, to thereby identify the case history on the input tape corresponding to that characteristic.

For example, assuming that the input tape shown in FIGURE 8 is one which represents a heart ailment, the marking of the input tape indicates that case histories 43083, 42972, 42975, 42979, 42901, 42907, 42830, and 42826 involved a heart ailment.

In like manner, each of the other input tapes 6 are prepunched or otherwise marked to identify those case histories which involved some other characteristic assigned to or represented by each particular input tape. Since the codal area assigned to a single case history appears on each of the input tapes 6 at an identical location, it will be apparent that when the input tapes 6 are superimposed one upon the other, the codal area assigned to each case history on each of the tapes will be vertically coincident. Thus, should an uninterrupted punched aperture extend through all the input tapes 6 as superimposed, the case history which has been assigned the particular codal area indicated by this punched hole is one in which the patient had all of the characteristics represented by the input tapes 6 collectively.

Referring to FIG. 1, the illustrated machine 1 includes six rods 28 suitably journalled in one end of the casing 2 which rods 28 receive the spools 4 for rotation; and a support platform 30 along which the input tapes 6 are advanced in superimposed relationship from the spools 4 to a discharge slot 32 at the other end of the casing 2 through which the tapes 6 pass to a suitable storage receptacle at the base of the machine. In the shown embodiment, the tapes 6 are advanced by a sprocket drive mechanism including the sprocket wheels 34, the teeth 36 of which are engageable with the tapes 6 to advance the same by means of a plurality of sprocket holes 7 provided along each of the side edges of the data tapes 6 dimensioned to receive the sprocket teeth 36. Engagement of sprocket holes 7 with sprocket teeth 36 maintains alignment, both laterally and transversely, of the plurality of tapes passing through the machine. The sprocket wheels 34 are powered by a suitable motor 40 (shown for illustrative purposes in FIG. 7 as being an adjustable speed motor).

The sensing and control device 10 for reading the input tapes 6 and for controlling the operation of the printing mechanism 12 comprises, in the preferred embodiment, ten photoelectric or light-sensitive cells 44 located in the tape reader head in support platform 30 to extend thereacross as shown in FIG. 1 so as to underlie respectively the unit codal areas of the superimposed tapes 6 during their travel along the support platform 30.

A plurality of lamps 46 positioned in alignment with the photoelectric cells 44, respectively, are provided to activate the photoelectric cells when coincident punched apertures in all the input tapes 6 appear directly below any one of the lamps 46, it being understood that the input tapes are opaque. In the shown embodiment, the lamps 46 are mounted in a cross bar 48 extending across the support platform 30 and having a leg portion 49 slidably mounted in the casing 2 at one side of the support platform 30 as shown in FIG. 1. The free end of the cross bar 48 is receivable in a notch 45 provided in the outer guide plate 29 which secures the cross bar in a position closely overlying the tapes 6. However, the cross bar 48 may be supported in any suitable manner such as by hinging it to the casing 2.

It will be understood that if a means other than a prepunched aperture is employed to identify those case histories involving a characteristic represented by the input tape, a suitable sensing device other than the one shown may be employed for reading the input tapes 6 and for controlling the printing mechanism 12.

An alternative method in which the tapes 6 are visually read for locating the case numbers of the information sources is provided in the shown embodiment by forming, such as with a glass insert 52, a portion 50 of the support platform 30 to be transparent and providing a lamp 54 (see FIG. 7) below the transparent portion 50 so as to illuminate the punched apertures in the superimposed tapes 6 as they pass over the transparent portion 50 whereby the operator of the machine may visually detect the holes representing case numbers which are in optical coincidence through all the tapes 6. In this regard there may be provided, as in the preferred embodiment, if desired, a suitable clutch or motor control means 55 (see FIG. 7) for changing the speed of the drive mechanism 8 to facilitate the visual reading thereof. To this end, a manual control handle 56 extending through the top of the casing 2 (as shown in FIG. 1) is provided for changing the advancement speed of the tapes 6 and for stopping their movement.

Turning to the printing mechanism 12 as best shown in FIGS. 2–6, it includes a first printing device 14 utilized to record the four higher order digits of each case number; and a second independently operable printing device 16 utilized to record the lowest order (unit) digit of each case number. The printing devices 14, 16 are shown as each including reciprocable platens 60, 62, respectively, (see FIG. 2) which are actuated by the solenoids 64, 66 associated therewith, respectively, the plungers 68, 70 of the solenoids 64, 66 being suitably connected to the platens 60, 62 to drive the same. The platens 60, 62 are positively guided in their reciprocating movement in the shown embodiment through means including a pair of vertically extending grooves or channels 65, 67 provided in the casing (see FIG. 2) to form guideways, channel 67 receiving one end of the platen 62 while channel 65 receives one end of a guide rod 69 fixed to the platen 60.

Although two platens 60, 62 and two associated solenoids 64, 66 for actuating the latter have been illustrated, it will be understood that a single platen together with a single or multiple solenoid arrangement, or any other arrangement for providing relative movement between the platens and the type bars and wheels may be utilized, if desired.

The printing device 14 further includes a printing head provided by a counter 72, preferably of the rotary indicator type, having numerical type wheels 74 positioned above the platen 60 so as to be cooperable therewith, for printing the four higher order digits of the case numbers. The counter type wheels 74 are stepped to register the higher order portion of the located case numbers by means of the motor 40 whose output shaft 41 is connected by coupling 76 to a main drive shaft 78 which in turn is connected to the wheel supporting shaft 80 of the counter 72 by the gear train generally designated 82, as best shown in FIGS. 2 and 3.

Figure 4:
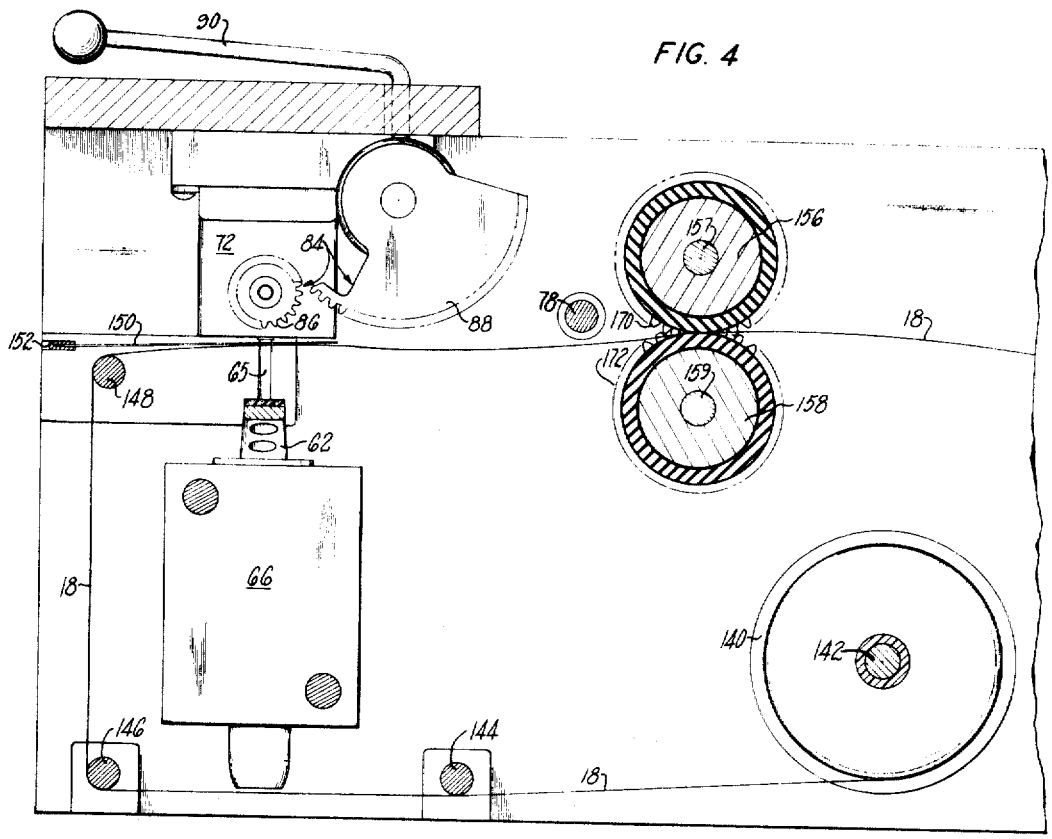
FIG. 4 is a fragmentary cross-sectional view taken generally along lines 4—4 of FIG. 2.

The driving mechanism of the counter 72 is synchronized with the sprocket drive mechanism 8 of the input tapes 6, so that the counter wheels 74 will register for printing, the four higher order digits of those case numbers which pass below the lamps 46 of the sensing device 10. A suitable reset mechanism 84 is provided for the counter 72 including reset gears 86, 88 and a manual reset arm 90 extending through the casing 2 of the machine as shown in FIGS. 1 and 4.

Figure 6:
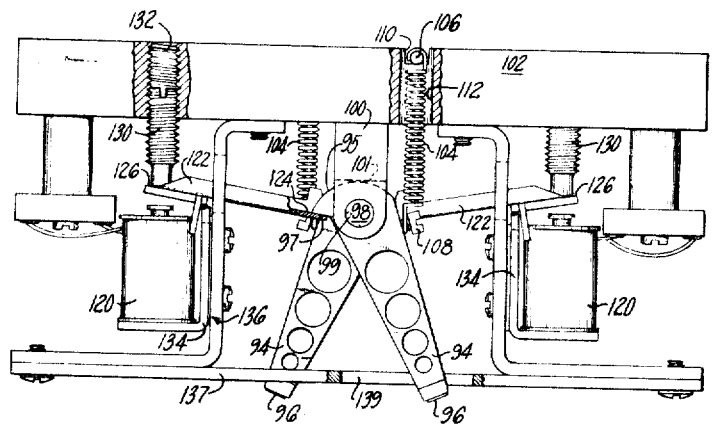
FIG. 6 is an enlarged fragmentary left-hand side view of a portion of the machine shown in FIG. 2.

Referring to FIGS. 2 and 6, the printing device 16 further includes a second printing head for recording the lowest order digit of the located case numbers, shown as comprising ten lever arms 94 having formed on their lower ends the numerical type 96 respectively including the numerals of the sequence 0–9 as shown in FIG. 3. The lever arms 94 are positioned above their associated platen 62 so as to be cooperable therewith and are mounted for pivotal movement at their upper ends by means of a shaft 98 received in mounting holes 99 provided in each of the lever arms 94.

The lever mounting shaft 98 is journalled in a yoke 100 which is in turn fixed to an overlying support block 102 depending from the top of the casing 2. As shown in FIG. 6, the bottom surface 101 of the yoke 100 is closely spaced from the upper ends 95 of the lever arms 94 so that impact on the lever arms 94 by the platen 62 during a printing operation will be transmitted, at least in part, to the support block 102 rather than being fully received by the lever mounting shaft 98.

Referring to FIG. 6, each of the lever arms 94 are biased to a retracted position where they are in inclined disposition, by means of a coil spring 104 having one end anchored to one of two cross pins 106 and the other end connected to the lever arm 94 as by means of a cap screw 108 fastened in the side of the lever arms 94 at the upper portion thereof. The cross pins 106 are received in a groove 110 provided across the support block 102 in the top surface thereof while the springs 104 are respectively received in the passages 112 provided in the support block in communication with the grooves 110.

Figure 7:
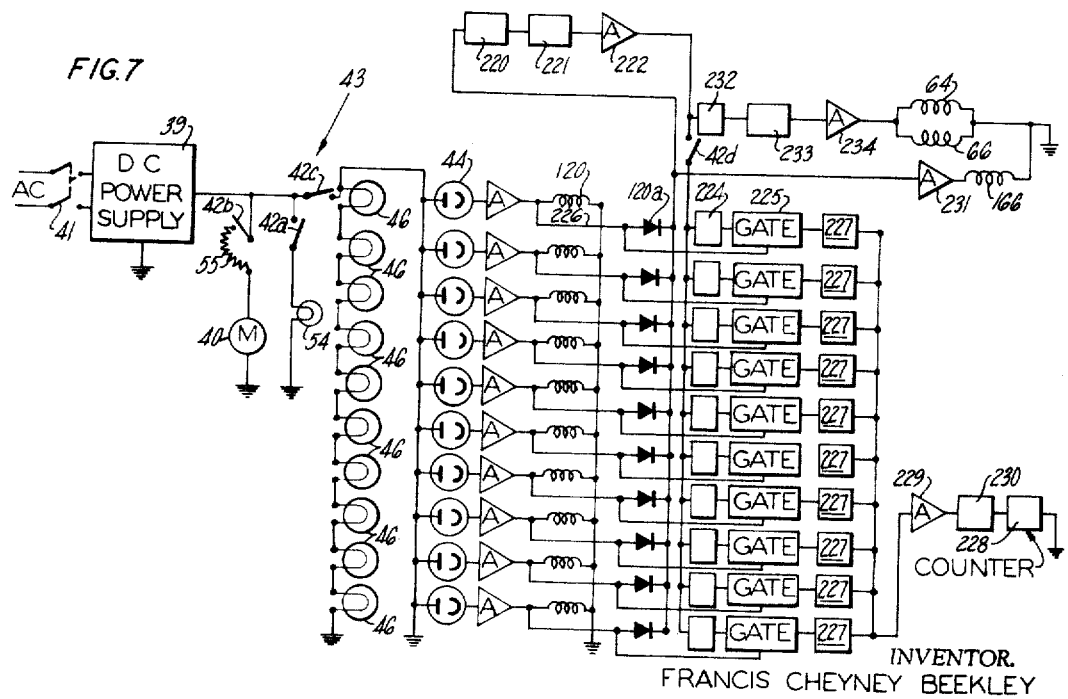
FIG. 7 is a schematic view of the electrical circuit for the machine.

In order to pivot the lever arms 94 into printing position wherein they extend generally vertically, (as viewed in the drawings) an independent actuator is provided for each lever arm 94, each actuator including a solenoid 120 connected in the circuit (see FIG. 7) to one of the photoelectric cells 44 to be energized thereby only when its associated photoelectric cell is activated. The arrangement between the solenoids 120 and the photoelectric cells 44 is such that the photoelectric cell which is positioned to underlie, for example, the numeral 4 on the input tapes is connected to the solenoid 120 which actuates the lever arm 94 bearing the type 4 so that the lever arm bearing the type 4 will be actuated into printing position only when the photoelectric cell 44, which reads the numeral 4 on the data tapes, is actuated. In like manner the other solenoids 120 are connected in the circuit as shown in FIG. 7.

Each of the solenoids 120 associated with the lever arms 94 include a pivotable armature 122 (see FIG. 6) having one end 124 engaging a shoulder 97 provided on the lever arms 94 to pivot the same when the solenoid is energized, and having another end 126 adapted to engage an adjustable stop 130 when the solenoids 120 are deenergized. The adjustable stops 130 are provided in the shown embodiment by screws threadedly received in the threaded bores 132 in the support block 102, which screws may be adjusted to vary the stroke of the armatures 122.

As shown in FIG. 6 in the illustrated embodiment, the solenoids 120 are supported on auxiliary brackets 134 which are fixed to the sides of a main bracket 136 suspended from the support block 102, the base 137 of the main bracket 136 being apertured at 139 to receive the lower ends of the lever arms 94 and to accommodate the pivotal movement of the latter.

Referring now to FIG. 4, the numbers identifying the selected case histories are printed on the print-out tape 18 which is made from paper or the like and supplied from a spool 140 mounted for rotation on a shaft 142 suitably journalled in the casing 2. The print-out tape 18 is first fed off the spool 140 horizontally to the left (as viewed in FIG. 4) below the guides 144, 146 and then vertically to one side of the guides 146, 148, and then to the right so that it passes between the platens 60, 62 and the counter wheels 74 and lever arms 94 for printing and finally out the discharge slot 20. An inked ribbon or the like 150 is positioned to rest on the print-out tape 18 between the latter and the printing heads 74, 94 by means of a holder 152 positioned in the slot provided in the casing.

In order to feed the print-out tape 18 off the spool 140 and through the printing mechanism and out of slot 20, there is provided in the illustrated embodiment a pair of friction rollers 156, 158, preferably rubber surfaced, which are fixedly mounted in overlying relationship on shafts 157, 159 so as to engage the opposite faces of the print-out tape 18 to draw the same in the right-hand direction as viewed in FIG. 4. Shafts 157, 159 are suitably journalled in the casing.

Figure 5:
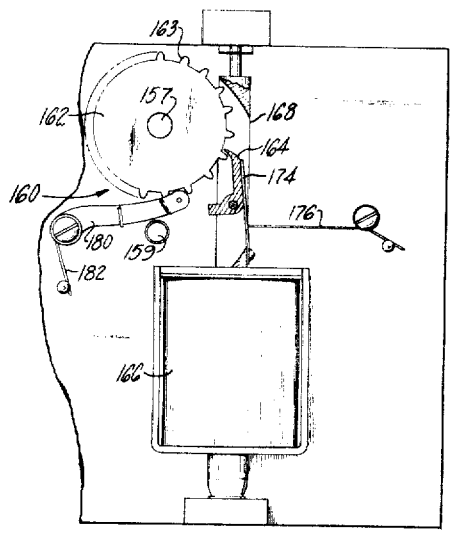
FIG. 5 is a fragmentary right-hand side view to a reduced scale of the portion of the machine shown in FIG. 2.

Referring to FIGS. 4 and 5, the friction rollers 156, 158 are intermittently rotated or stepped through means of a ratchet drive mechanism, generally designated 160, including ratchet wheel 162 fixed to shaft 157 to drive the same, a pawl 164 engageable with the ratchet wheel 162 to step the same, and a solenoid 166 having a plunger 168 in which the pawl 164 is pivotally connected to be reciprocated upon energization and de-energization of the solenoid 166. Movement is transmitted to the lower shaft 159 and friction roller 158 by the meshing gears 170, 172 which are fixedly mounted on shafts 157, 159.

As best shown in FIG. 5, the pawl 164 is biased into engagement with the ratchet wheel 162 by means of a leaf spring 174 while a suitable spring 176 may be provided for urging the solenoid plunger 168 downwardly. A retaining or nonbackup pawl such as 180 is provided to maintain the ratchet wheel 162 in each of its stepped positions, the retaining pawl 180 being biased by a spring 182 into engagement with the ratchet wheel 162.

In order to provide a clean smudge-free print of the located case numbers on the print-out tape 18, means are provided to cause the movement of the print-out tape 18 to lag behind the movement of the platens 60, 62 into printing contact with the tape 18. In the illustrated embodiment, this means comprises initial lost motion travel of the solenoid plunger 168 so that although the platen solenoids 64, 66 and the ratchet solenoid 166 are simultaneously energized, the stepping engagement between the pawl 164 and the ratchet wheel 162, and consequent advance of print-out tape 18, will occur after the platens 60, 62 have moved upwardly for printing. It will also be apparent that the lag of the movement of the print-out tape 18 may result from the relative time delays built in to the energization circuits for the solenoid 166 relative to the solenoids 64 and 66.

The operation of the information retrieval machine of this invention will be apparent from the foregoing description taken in connection with the following explanation:

Assuming that it is desired to locate case histories relating to the treatment of a stomach ulcer in which cases had occurred within a certain age group and which also involved the complications of four other conditions such as a heart weakness, hemorrhaging, high blood pressure, and nonsurgical treatment, those input tape spools 4, each representing one of these characteristics or conditions, respectively, are selected and mounted on a preassigned rod 28 at the end of the machine as shown in FIG. 1, bearing in mind that each tape 6 has the same codal area thereon reserved for the same individual case number and that a hole in the reserved area will identify a case in which the specific characteristic represented by that input tape was involved. The leading ends of input tapes 6 are then placed on platform 30 and their sprocket holes 7 engaged with sprocket teeth 36 so that the tapes 6 lie in superimposed relationship and aligned so that the identical case numbers will be positioned in alignment, one below the other, the codal areas reserved for the case numbers being arranged on the respective input tapes 6 so that when the sprocket holes 7 are engaged with sprocket teeth 36 this alignment will result. The tapes 6 in their superimposed relationship are then in position to be advanced along the platform 30 by drive mechanism 8. The machine is now ready for automatic operation.

Referring now to the schematic circuit diagram of FIG. 7, a main switch 41 is provided to connect the machine to a source of electrical power. As shown schematically, the power is fed into a DC power supply 39 which in turn is shown as powering a variable speed motor 40 through a switch 42b, a light 54 disposed below the glass insert 52 of the machine for visual reading of the optical coincidence of the tapes through a switch 42a, and the electrical sensing and printing circuit and the lamps 46 for the sensing device through a switch 42c.

Each of the illustrated ten photocells 44 of the sensing device or reader head has its output connected to an amplifier to power a solenoid coil 120 for the unit digit lever arms 94 when the photocell is activated as hereinbefore described. The ends of the solenoids 120 are grounded as indicated to complete the electrical circuit. Each of the type solenoids 120 is monitored by an isolating diode 120a, the outputs of which are fed into a one-shot multivibrator 220. The sweep generator 221 is gated off at the end of the time constant of the one-shot multivibrator 220.

When there is optical coincidence of tapes passing one of the photocells 44, the one-shot multivibrator 220 is triggered and its output in turn triggers a sweep generator 221 which provides a linearly varying output voltage. This output signal of the sweep generator is fed through an amplifier 222 to the input of a plurality of unijunction pulse generators 224 (corresponding in number to the number of photocells). The unijunction pulse generators 224 are designed to have different voltage firing levels so that each will fire at slightly different time intervals during the period of time the sweep generator is providing an output signal. Thus, the unijunction pulse generators 224 each produce sequentially an output signal during every output signal of the sweep generator 221 which is whenever one of the photocells 44 is activated.

It will thus be seen that the use of a sweep generator having a linear varying voltage for sequentially triggering a plurality of pulse generators adjusted to have different voltage firing levels provides a simple means for obtaining a large number of signals having individually adjustable time delays.

The output of each unijunction pulse generator 224 is fed into a plurality of gate circuits 225, respectively, each of which is individually connected to the output of one of the photocells 44 through a lead 226 as indicated. The output of each gate circuit 225 is fed into an isolating network 227, the outputs of which are joined together and fed into an electronic decade counter 228 through an amplifier 229 and a one-shot multivibrator 230.

Thus it will be apparent that the ten unijunction pulse generators 224 of the illustrated embodiment will produce a train of ten output signals in a burst whenever the sweep generator 221 is gated on and that the gate circuits 225, each of which monitors the state of the excitation of the corresponding type solenoid 120, will produce sequential output signals corresponding to the number of photocells 46 which are activated. Since the output signals of the gate circuits 225 sequentially trigger the electronic decade counter 228, the decade counter will indicate the total number of reference sources having all the characteristics assigned to the tapes passing the sensing head.

As indicated in FIG. 7, a switch 42d may be provided to disconnect the unijunction pulse generators if an indication of the total number of reference sources having the desired characteristics is not desired.

The output of the isolating diodes 120a is also fed to an amplifier 231 which in turn energizes the solenoid 166 for the print-out paper drive mechanism which operates as hereinbefore described.

As shown in FIG. 7, an additional unijunction pulse generator 232 is provided to energize the platen solenoids 64, 66 through a one-shot multivibrator 233 and an amplifier 234 which provides a time delay before energizing the platen solenoids 64, 66 to give the type solenoids 120 sufficient time to move the type levers 94 into printing position. The longer mechanical response time of the print-out tape solenoid 166 affords sufficient time so that the platen solenoids have been activated to print the reference numbers on the tape before the paper is moved to the next printing position.

From the foregoing, it will be apparent that as each column 24 of the numerals 0–9 (which represent the lowest order digits of the case numbers on the input tapes) passes below the lamps 46, each of the numerals 0–9 will be scanned or read simultaneously by the photoelectric cells 44, respectively, while the counter wheels 74 will register the four higher order digits of the case numbers to thereby simultaneously sense ten case numbers in one instant.

Should optical coincidence occur due to the alignment of apertures through all of the input tapes 6 below any one of the lamps 46 (indicating the location of a case history having all the characteristics represented by the tapes) the photoelectric cell 44 underlying the uninterrupted aperture will be activated by its associated lamp 46 (as permitted by the uninterrupted aperture) whereby a signal will be produced to energize the platen solenoids 60, 62, the solenoid 166 associated with the ratchet drive mechanism for the friction rollers, and that solenoid 120 associated with the lever arm 94 bearing the numeral type corresponding to the numeral on the input tapes 6 through which the uninterrupted aperture is located. This will result in pivoting of the appropriate lever arm 94 to printing position and movement of platens 60, 62 upwardly against the type wheels 74 and the pivoted lever arm 94 to thereby print the located case number in its entirety on the print-out tape 18, the advancement of which accompanies the movement of the platens 60, 62 but lags slightly therebehind as described above to insure a smudge-free print on the print-out tape 18.

The selected case numbers are printed on the print-out tape 18 in the manner represented in FIG. 9 wherein the four higher order numerals of the case number are printed together, and the lowest order numeral of the selected case number is printed to one side of the four higher order numerals but in alignment therewith so as to be read together. When more than one case number has been selected for one column of numerals passing the lamps 46, a plurality of sensing cells 44 will be simultaneously activated and the corresponding case numbers printed on the recording tape 18 in the same general manner shown at 180 in FIG. 9 wherein the shown arrangement of numerals represents the case numbers 42972, 42975, and 42979.

In like manner, the sensing operation is continued until the input tapes are completely read by the sensing device 10 whereupon the print-out tape 18 with the located case numbers printed thereon may be advanced manually until all printed numbers are visible beyond the discharge slot 20, and the print-out tape severed at that point.

The foregoing has described the process of scanning a group of tapes typical of a search for information from sources which have been indexed and recorded on input tapes as described above with the indexing being by the method commonly known as "indexing by descriptors" and/or "indexing by descriptive terms." The above-described input tapes may, however, alternatively record indexing of information sources by other indexing methods and may also record statistical data for analysis by the same above-described method. In any case, the process of scanning, sensing and print-out may be performed with a single input tape or with a plurality of input tapes coincidently passing through the machine.

Upon completion of print-out of a single input tape or of a plurality of input tapes, as above described, the tape(s) may be rewound on their respective bobbins 4 on spindles 28 by a motor (not shown) which rotates the bobbins 4 in a counter-clockwise direction thereby rewinding tapes 6 on their bobbins 4.

Thus it will be seen from the foregoing that the machine of the present invention not only provides a method of correlating and locating information sources but further provides a novel arrangement wherein a plurality of different information sources may be simultaneously scanned, and if selected, simltaneously recorded so as to permit the scanning of the next plurality of information reference numbers to proceed at a steady and high rate of speed. Moreover, one or more additional scanning heads, each scanning one or more additional input tapes indexed by other descriptive terms, may be used with the scanning head 10 of the illustrated embodiment. With such a plurality of scanning heads reading the tapes passing respectively therethrough in synchronism and having their outputs electrically connected to produce output signals only when the discrete codal area of all the tapes corresponding with a particular information source is apertured and passes through the several scanning heads simultaneously to operate a printing mechanism such as additional type levers 94, an arrangement is provided wherein different depths of search may be indicated on the print-out tape by additional symbols printed thereon by the additional type levers 94.

As will be apparent to persons skilled in the art, various modifications and adaptations of the structure above described will become readily apparent without departure from the spirit and scope of the invention, the scope of which is defined in the appended claims.

I claim:

1. In a machine for identifying information sources which are indexed on input tapes according to selected characteristics and the like, a printing mechanism for printing the identification indicia information sources having the selected characteristics comprising in combination: a counter having a plurality of type wheels for printing the first portion of the identification indicia, a plurality of type arms operable independently of the counter each adapted to simultaneously print the terminal portion of the identification indicia for one or more of the information sources having the selected characteristics, a platen means cooperable with said type wheels and said type arms for printing the identification indicia, and an actuator means including a solenoid for moving said platen means relative to said type wheels and arms for printing.

2. In a machine for printing identification indicia representing information sources which are previously indexed according to selected characteristics and the like, a printing mechanism for printing the identification indicia comprising in combination: a first printing device for printing a portion of the indicia including a counter having a plurality of type wheels, means for moving the platen and the type wheels toward each other, a second printing device for independently and simultaneously printing the terminal portion of the indicia including a plurality of type arms, platen means cooperable with said printing devices, and means for moving said platen means and said printing devices toward each other.

3. In a machine for selecting identification indicia representing information sources, a print-out mechanism for printing the identification indicia which consists of a plurality of symbols of different order, said mechanism comprising: a counter having a plurality of type wheels for registering and printing the higher order symbols of the identification indicia, a plurality of type arms operable independently of each other for printing the lowest order symbol of the identification indicia, a platen means simultaneously cooperable with said type wheels and arms for printing the identification indicia, a solenoid for actuating the platen means, each of said type arms having associated therewith an actuator for moving said type arms into a printing position, and means for simultaneously energizing said solenoid and certain of said actuators of the type arms to simultaneously print out a plurality of the lowest order symbols of a plurality of identification indicia.

4. In an information source locating machine, a printing mechanism for printing identification indicia selected by the machine comprising in combination: a counter having a plurality of indicia-bearing type wheels for printing the higher order portion of the identification indicia, a plurality of levers each having indicia type and being operable independently of the counter for printing the lower order symbol of the identification indicia, a platen means cooperable with said type wheels and levers, means mounting the levers for pivotal movement between a first retracted position and a second extended position wherein the type is in overlying relationship with the platen means ready for printing, each lever having an independent actuating means including a solenoid for moving the lever into said printing position, a solenoid for actuating said platen means and means for simultaneously energizing the solenoid associated with said platen and a number of the solenoids included in the actuating means for the levers to simultaneously print the higher order portion of the identification indicia and the lower order symbols of all of the selected identification indicia.

5. An information source locating machine comprising, a support adapted to receive a plurality of superimposed tapes bearing indicia representing information sources to be located by the machine, means for advancing the tapes on said support, sensing means for reading and selecting indicia on the superimposed tapes at a point on the support and for providing a signal upon selection of indicia; a printing mechanism for printing the indicia selected by said sensing means including a counter having a plurality of type wheels operable to register a portion of the indicia on the tapes passing at said point, a plurality of the type arms operable independently of the counter for registering the terminal portion of the indicia passing said point, a platen means cooperable with said type wheels and said type arms for printing the selected indicia, means for stepping the counter wheels operable in synchronism with said means for advancing the tapes, means for actuating said platen means in response to the signal provided by the sensing means and means for actuating a number of said type arms to register the remaining portion of indicia passing at said point in response to the signal provided by said sensing means.

6. The combination defined in claim 5 including means operable in response to the signal provided by said sensing means for advancing a print-out tape between said platen means and said type wheel and arms.

7. The combination as defined in claim 6 wherein said means for advancing the print out tape includes a pair of friction rollers and means for rotating said friction rollers including a ratchet wheel, a pawl engageable with the ratchet wheel to step the same, and a solenoid for moving the pawl.

8. The combination as defined in claim 5 wherein said sensing means includes a plurality of photoelectric cells positioned on the support on one side of the superimposed tapes and a lamp means positioned on the other side of said superimposed tapes in alignment with said photoelectric cells.

9. The combination defined in claim 8 wherein said means for actuating the type arms includes a plurality of solenoids each associated with one type arm and one photoelectric cell.

10. The combination defined in claim 5 including a motor for operating both the means for advancing the tapes and the means for stepping the counter wheels.

11. A machine comprising a support platform for receiving a plurality of superimposed input tapes to be advanced thereon; a plurality of input tapes on the platform each representing a specific characteristic, each of said tapes having marked thereon identical indicia located in an identical relative position thereon and representing information sources, said tape being apertured at those indicia representing information sources having the specific characteristic of the respective tape; a sensing means on said support platform for reading the input tapes and operable in response to the optical coincidence of apertures in all the superimposed tapes, said sensing means including means providing an output signal; means for advancing the input tapes on said support platform to said sensing means; a printing mechanism for printing an identification symbol corresponding to the indicia triggered by an output signal from said sensing means and including a counter having a plurality of type wheels operable to register the higher order portion of the identification symbol, a plurality of type arms operable independently of the counter for registering the remaining lower order portion of the identification symbol corresponding to the indicia being sensed by the sensing means, means for advancing the counter wheels operable in synchronism with said means for advancing the tapes and a platen means cooperable with said type wheels and said type arms for printing the identification symbol.

12. The machine as defined in claim 11 wherein each input tape comprises a plurality of blocks of codal areas each having a group of identical indicia to be sensed by the sensing means forming the lowest order portion of the complete identification indicia, each block of codal areas further having other indicia forming the higher order portion of the complete indicia, the blocks of codal areas being arranged successively on the tape.

13. The machine as defined in claim 12 wherein said lowest order portion of the complete indicia on said input tapes are represented by one of the digits of the sequence 0–9, the type arms bear numerical type including the digits 0–9, inclusive, respectively, and wherein said sensing means includes ten individual components, each component being positioned to sense one of the lowest order digits respectively on the tapes and being associated with the type arm bearing the same digit as the lowest order digit on the tape sensed by the component.

14. The machine as defined in claim 11 wherein said means for advancing the input tapes on said support platform includes a plurality of spaced sprocket teeth-receiving holes provided longitudinally along the tape and a sprocket drive mechanism including a sprocket wheel having teeth dimensioned to be received in said holes of the tapes.

15. In a machine for printing the identification indicia comprising higher order symbols and unit order symbols, the improvement comprising a plurality of printing devices operable independently of each other for respectively printing each of the lowest order symbols of the identification indicia, platen means cooperable with each of said printing devices, and means for selectively moving one or more of said printing devices relative to said platen means to simultaneously print the lower order symbol of all of the identification indicia corresponding to said printing devices moved relative to said platen means.

References Cited

UNITED STATES PATENTS

| | | | |
|---|---|---|---|
| 2,687,088 | 8/1954 | Hennessy et al. | 101—95 |
| 2,894,255 | 7/1959 | Murphy | 340—347 |
| 2,975,228 | 3/1961 | Doty et al. | 178—3 |
| 3,139,818 | 7/1964 | Koehn | 101—93 |
| 3,195,399 | 7/1965 | Jonker | 88—24 |
| 3,196,403 | 7/1965 | Ivins | 340—172.5 |

OTHER REFERENCES

Wildhack, W. A., Stern, J., and Smith, J., "Documentation in Instrumentation," American Documentation, vol. V, No. 4, 1954.

ROBERT C. BAILEY, *Primary Examiner.*

O. E. TODD, *Assistant Examiner.*